(12) United States Patent
Chen

(10) Patent No.: US 7,937,840 B2
(45) Date of Patent: May 10, 2011

(54) KNIFE CONNECTOR

(76) Inventor: Kun-Chen Chen, Taichung Hsien (TW)

( * ) Notice: Subject to any disclaimer, the term of this patent is extended or adjusted under 35 U.S.C. 154(b) by 327 days.

(21) Appl. No.: 12/205,029

(22) Filed: Sep. 5, 2008

(65) Prior Publication Data

US 2010/0058914 A1 Mar. 11, 2010

(51) Int. Cl.
*B26B 5/00* (2006.01)
(52) U.S. Cl. .......................................... 30/337; 30/329
(58) Field of Classification Search .................. 30/329, 30/332, 333, 337, 339, 392, 517, 519; 83/699.21; 81/489, 491, 487, 438, 439, 177.1, 177.7, 81/177.75
See application file for complete search history.

(56) References Cited

U.S. PATENT DOCUMENTS

| 257,978 A | * | 5/1882 | Robinson | 30/519 |
| 1,932,458 A | * | 10/1933 | Hanson | 30/330 |
| 6,546,633 B1 | * | 4/2003 | Lovell et al. | 30/334 |
| 2005/0138816 A1 | * | 6/2005 | Ping | 30/339 |
| 2009/0217536 A1 | * | 9/2009 | Medhurst | 30/337 |

* cited by examiner

*Primary Examiner* — Stephen Choi
(74) *Attorney, Agent, or Firm* — Rabin & Berdo, P.C.

(57) ABSTRACT

A knife connector includes a base, a cover, a clamping device and a connecting stub. The base has a holding side, a knife-holding end, a connecting end opposite to the knife-holding end and a holding cavity. The holding cavity is defined in the holding side and has an opening defined in the knife-holding end. The cover is pivotally connected to the base to close the holding cavity. The clamping device is mounted on the base and holding the cover on the base to close the holding cavity. The connecting stub is mounted on the connecting end of the base and has a non-circular cross section and an engaging recess defined around the connecting stub. Accordingly, the knife connector can detachably and changeably connect a blade body to a handle to fit with different kinds of cutting tools.

12 Claims, 7 Drawing Sheets

US 7,937,840 B2

KNIFE CONNECTOR

BACKGROUND OF THE INVENTION

1. Field of the Invention

The present invention relates to a connector, and more particularly to a connector for holding a knife, a blade, a saw or the like and detachably and changeably connecting the knife to a handle.

2. Description of Related Art

A conventional cutting tool, such as a knife, blade or a saw substantially comprises a handle and a blade body securely attached to the handle, such that a user can cut an object with the cutting tool. However, the blade body of the conventional cutting tool is undetachably connected to the handle, so the blade body of the conventional cutting tool is unchangeable and not versatile in use.

To overcome the shortcomings, the present invention tends to provide a knife connector to mitigate or obviate the aforementioned problems.

SUMMARY OF THE INVENTION

The main objective of the invention is to provide a knife connector that can detachably and changeably connect a blade body to a handle to fit with different kinds of cutting tools.

The knife connector includes a base, a cover, a clamping device and a connecting stub. The base has a holding side, a knife-holding end, a connecting end opposite to the knife-holding end and a holding cavity. The holding cavity is defined in the holding side and has an opening defined in the knife-holding end. The cover is pivotally connected to the base to close the holding cavity. The clamping device is mounted on the base and holding the cover on the base to close the holding cavity. The connecting stub is mounted on the connecting end of the base and has a non-circular cross section and an engaging recess defined around the connecting stub.

Other objects, advantages and novel features of the invention will become more apparent from the following detailed description when taken in conjunction with the accompanying drawings.

DETAILED DESCRIPTION OF PREFERRED EMBODIMENT

Figure 1:
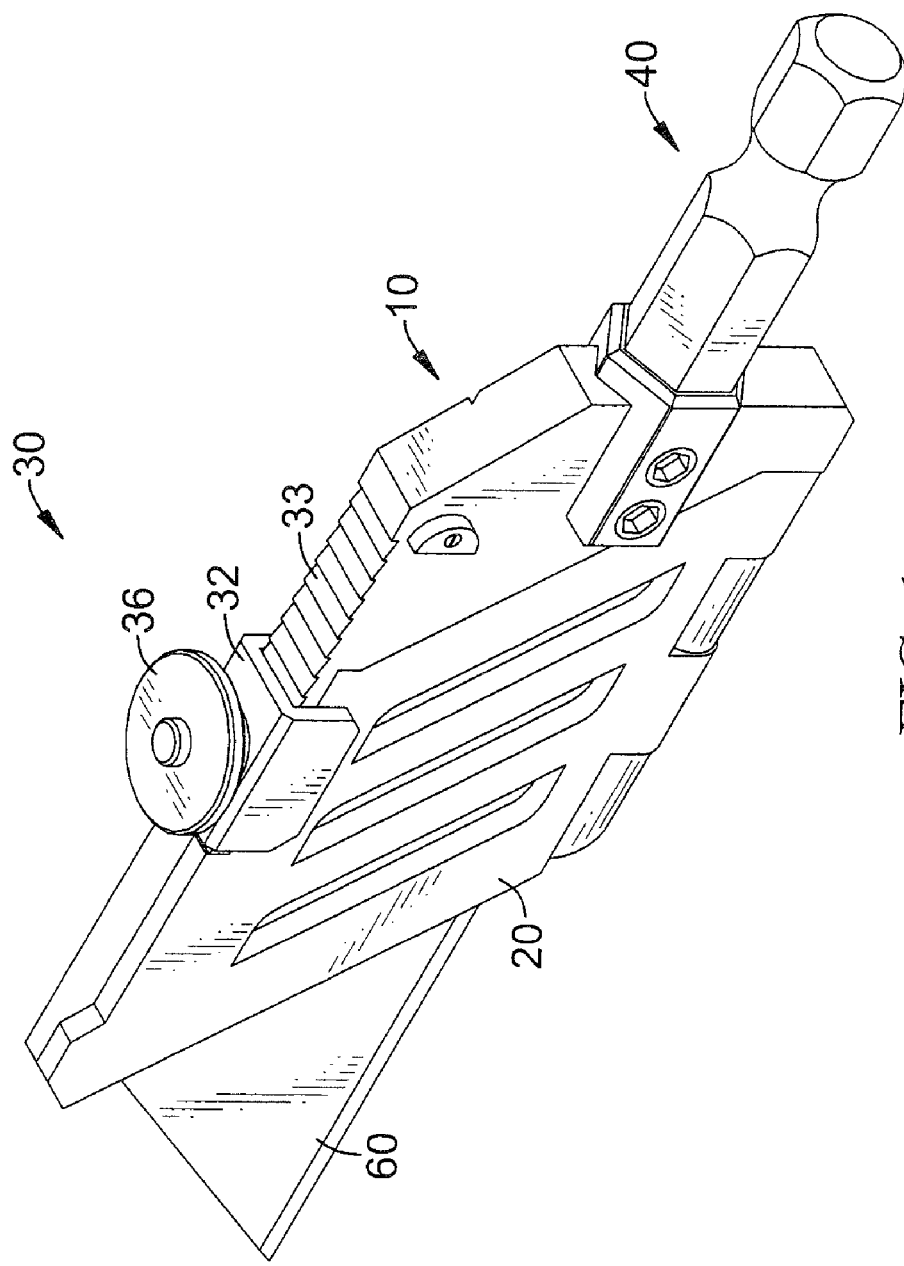
FIG. 1 is a perspective view of a knife connector in accordance with the present invention.
Figure 2:
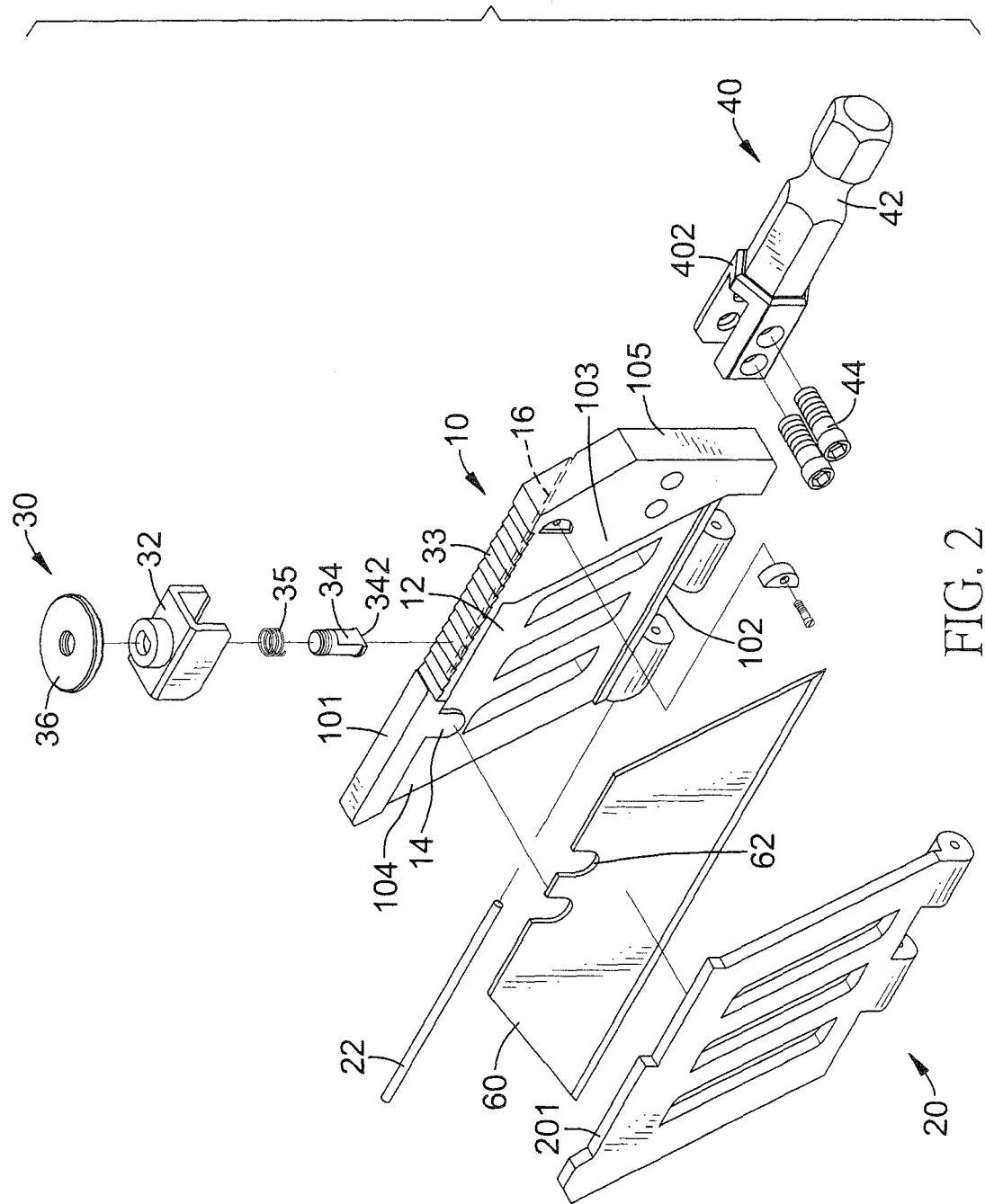
FIG. 2 is an exploded perspective view of the knife connector in FIG. 1.
Figure 3:
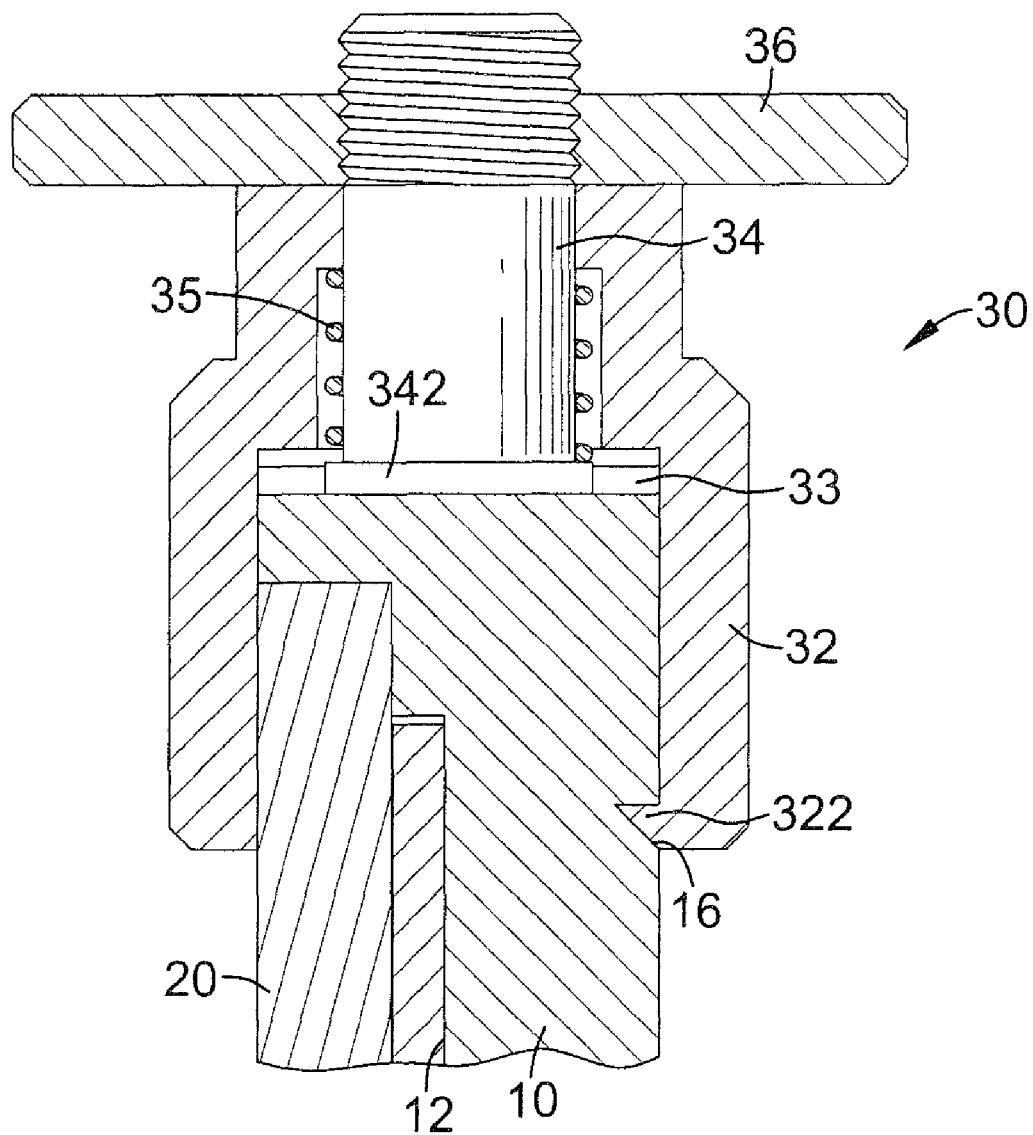
FIG. 3 is an enlarged side view in partial section of the knife connector in FIG. 1.

With reference to FIGS. 1 to 3, a knife connector in accordance with the present invention comprises a base (10), a cover (20), a clamping device (30) and a connecting stub (40).

The base (10) has a top edge (101), a bottom edge (102), a holding side (103), a knife-holding end (104), a connecting end (105) opposite to the knife-holding end (104) and a holding cavity (12). The holding cavity (12) is defined in the holding side (103) and has an opening defined in the knife-holding end (104).

In addition, the base (10) further has a positioning device mounted on the holding side (103) to position one end of a blade body (60) in the holding cavity (12). In an embodiment, the positioning device comprises a protrusion (14) formed on a top edge of the holding cavity (12) and engaging one of notches (62) in a blade body (60) as shown in FIG. 2. In an alternative embodiment, the positioning device comprises a knob (15) formed on a bottom of the holding cavity (12) and mounted in a hole (64) defined in a blade body (60A) as shown in 7.

The cover (20) is pivotally connected to bottom edge of the base (10) with a pivot (22) and has a top edge (201) corresponding to the top edge (101) of the base (10).

The clamping device (30) is mounted on the top edge (101) of the base (10) and holds the cover (20) on the base (10) to close the holding cavity (12). The clamping device (30) comprises a slider (32), multiple positioning teeth (33), a positioning post (34) and a spring (35). The slider (32) has an inverse U-shaped cross section, is slidably mounted on the top edge (101) of the base (10) and selectively clamps the top edge (201) of the cover (20). In a preferred embodiment, a guiding channel (16) is defined in the base (10) at a side opposite to the holding side (103) near the top edge (101). The slider (32) further has a guiding flange (322) formed on a bottom of the slider (32) and slidably extending into the guiding channel (16) in the base (10). With the engagement between the guiding flange (322) and the guiding groove (16), the slider (32) can slide smoothly along and relative to the top edge (101) of the base (10).

The positioning teeth (33) are defined in the top edge (101) of the base (10). The positioning post (34) is mounted slidably on the slider (32) and has a bottom end (342) engaging one of the positioning teeth (33). The spring (35) is mounted around the positioning post (34) and provides a force to push the bottom end (342) of the positioning post (34) engaging a corresponding positioning tooth (33). With the engagement between the bottom end (342) of the positioning post (34) and a corresponding positioning tooth (33), the slider (32) can be held in place on the top edge (101) of the base (10).

To disengage the slider (32) from the top edge (201) of the cover (20), the positioning post (34) is pulled upward to disengage from the positioning teeth (33) so that the slider (32) can be moved backward smoothly to disengage from the cover (20). To facilely pull the positioning post (34), a finger tab (36) is securely attached to the top end of the positioning post (34).

The connecting stub (40) is mounted on the connecting end (105) of the base (10) and has a non-circular cross section and an engaging recess (42) defined around the connecting stub (40). In a preferable embodiment, the connecting stub (40) has a hexagonal cross section. The connecting stub (40) has a U-shaped end (402) mounted over the connecting end (105) of the base (10). Multiple fasteners (44) are mounted through the U-shaped end (402) of the connecting stub (40) and the connecting end (105) of the base (10) to securely attach the connecting stub (40) on the connecting end (105) of the base (10). In an alternative embodiment, the connecting stub (40) can be formed integrally on the connecting end (105) of the base (10).

With such a knife connector, one end of a blade body (60) can be put into the holding cavity (12) via the opening in the holding end (104) of the base (10) after the cover (20) being opened, and the cover (20) is pivoted to close the holding cavity (12). Then, the slider (32) of the clamping device (30) is moved along the top edge (101) of the base (10) to clamp the top edge (201) cover (20), such that the blade body (60) is connected to the knife connector. When the slider (32) is moving along the positioning teeth (33), the bottom end (342) of the positioning post (34) is pushed to disengage from and by a corresponding positioning tooth (33). Then, spring (35) will push the positioning post (34) to reengage a next positioning tooth (33) after the bottom end (342) of the positioning post (34) passing over a previous one. Thus, the slider (32) can be move smoothly along the top edge (101) of the base (10) and held in any desired place relative to the base (10) with the engagement between the positioning post (34) and a corresponding positioning tooth (33).

Figure 4:
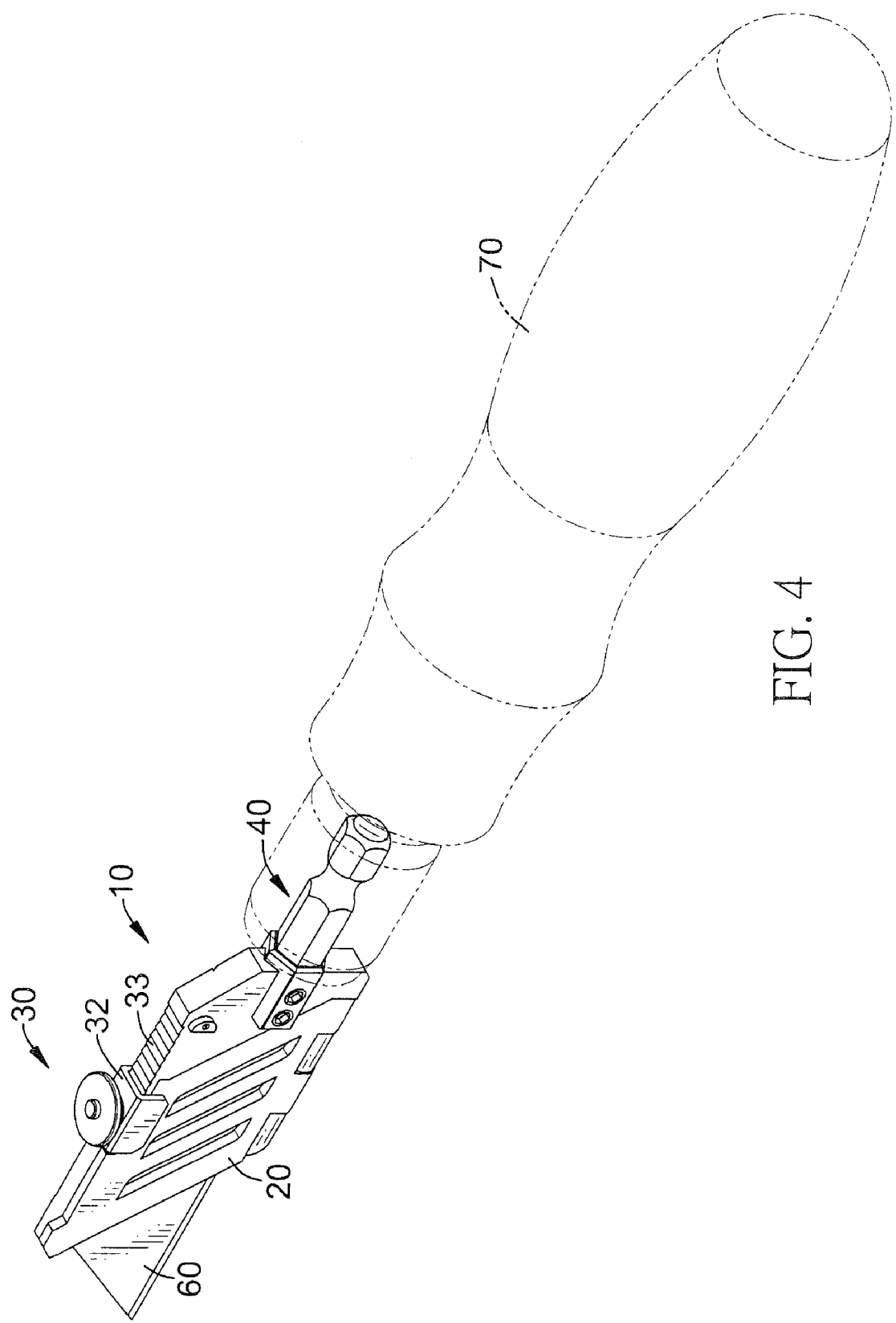
FIG. 4 is a perspective view of the knife connector in FIG. 1 showing that a knife body is connected to a handle with the knife connector.

Accordingly, with further reference to FIG. 4, the blade body (60) can be connected to a handle (70) by inserting the connecting stub (40) into a holding hole in the handle (70), and a user can use the blade body (60) to cut an object conveniently.

Figure 5:
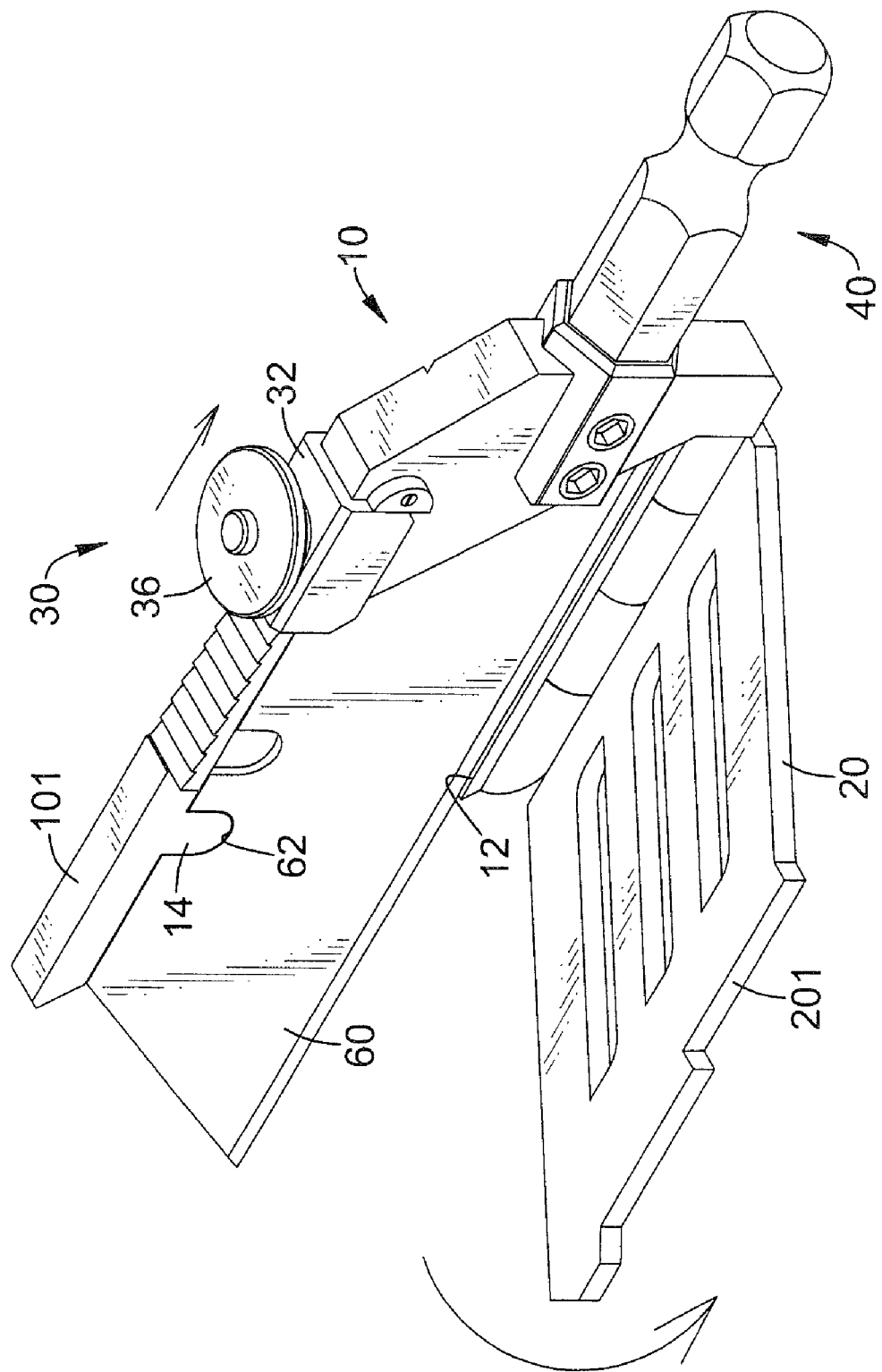
FIG. 5 is an operational perspective view of the knife connector in FIG. 1 showing that the cover is opened for removing the knife body from the knife connector.
Figure 6:
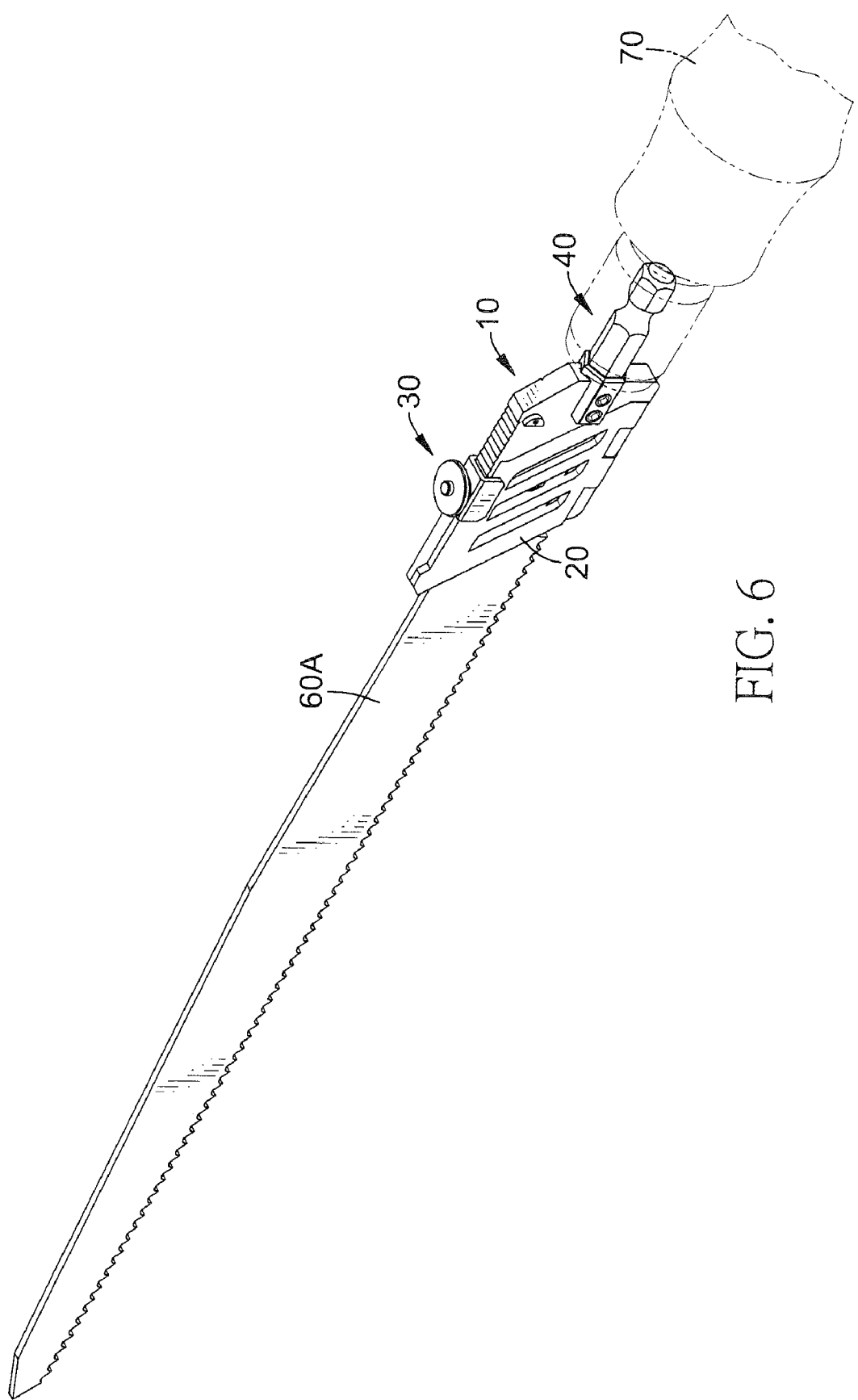
FIG. 6 is a perspective view of the knife connector in FIG. 1 showing that another kind of knife body is connected to a handle with the knife connector.
Figure 7:
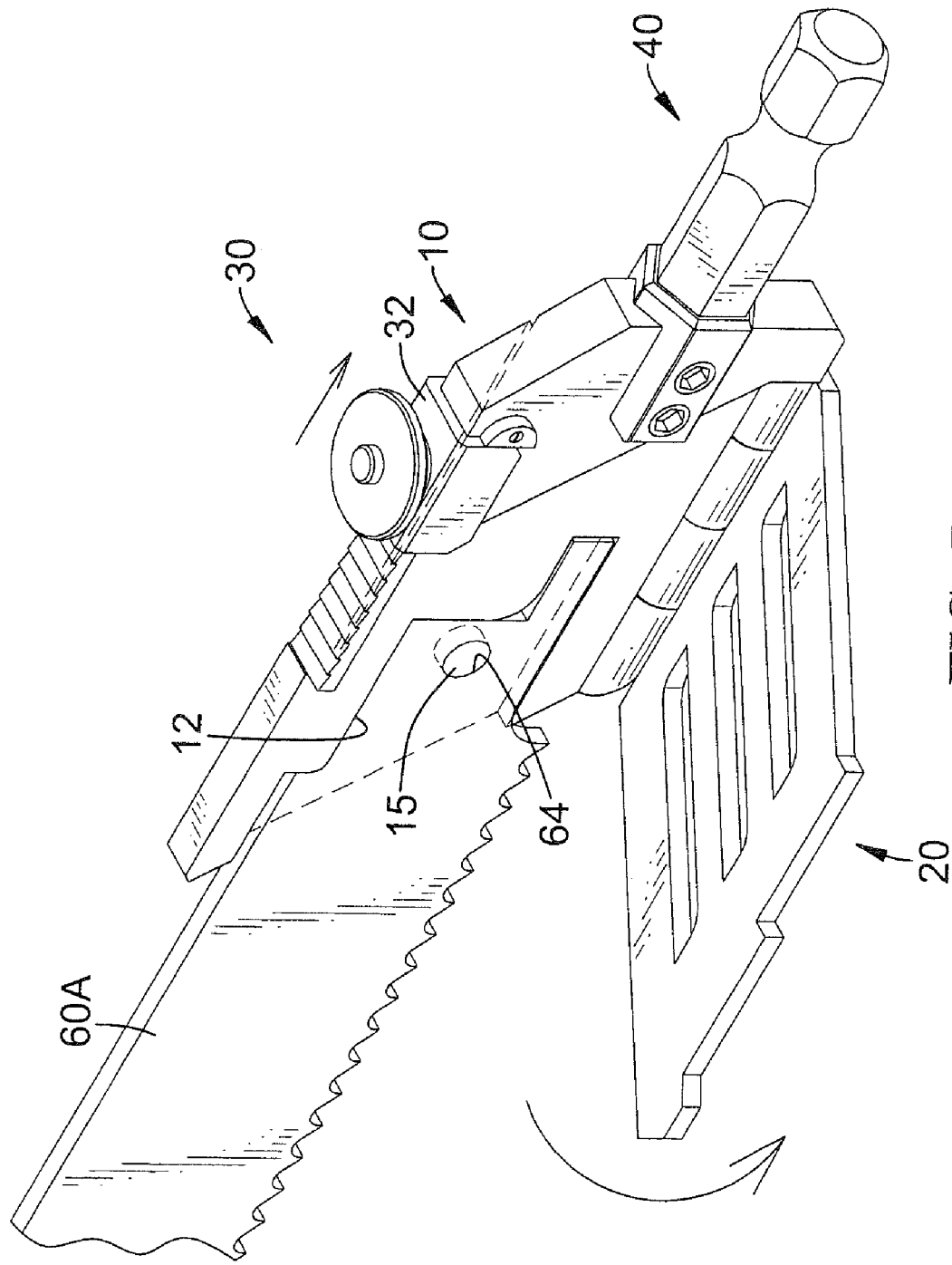
FIG. 7 is an operational perspective view of another embodiment of a knife connector in accordance with the present invention.

When the slider (32) is moved to a position where the slider (32) escapes from the top edge (201) of the cover (20), with further reference to FIG. 5, the cover (20) can be pivoted and opened. Consequently, the blade body (60) can be moved to make another notch (62) engaging the protrusion (14) of the positioning device, such that the length of the blade body (60) protruding from the connector can be changed and adjusted. Furthermore, the blade body (60) can be removed from the holding cavity (12), and another blade body (60A) is then put into the holding cavity (12) as shown in FIG. 6. Accordingly, the knife connector can fit with different kinds of blade bodies (60,60A) and connect the blade bodies (60,60A) to a handle (70), such that the knife connector is convenient and versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A knife connector, comprising:
    a base, having
        a holding side;
        a knife-holding end;
        a connecting end opposite to the knife-holding end; and
        a holding cavity defined in the holding side and having an opening defined in the knife-holding end;
    a cover pivotally connected to the base to close the holding cavity;
    a clamping device mounted on the base and holding the cover on the base to close the holding cavity; and
    a connecting stub mounted on the connecting end of the base and having
        a non-circular cross section; and
        an engaging recess defined around the connecting stub, wherein
    the base has a top edge and a bottom edge;
    the cover is pivotally connected to the bottom edge of the base with a pivot and has a top edge corresponding to the top edge of the base;
    the clamping device is mounted on the top edge of the base and comprises a slider slidably mounted on the top edge of the base and selectively clamping the top edge of the cover; and
    the clamping device further comprises
        multiple positioning teeth defined in the top edge of the base;
        a positioning post mounted on the slider and having a bottom end engaging one of the positioning teeth on the base; and
        a spring mounted around the positioning post and providing a force to push the positioning post to engage a corresponding positioning tooth.

2. The knife connector as claimed in claim 1, wherein the base further has a guiding channel defined in a side opposite to the holding side near the top edge; and
    the slider of the clamping device further has a guiding flange formed on a bottom of the slider and slidably extending into the guiding channel in the base.

3. The knife connector as claimed in claim 2, wherein the connecting stub has a U-shaped end mounted over the connecting end of the base; and
    multiple fasteners are mounted through the U-shaped end of the connecting stub and the connecting end of the base to securely attach the connecting stub on the connecting end of the base.

4. The knife connector as claimed in claim 3, wherein the connecting stub has a hexagonal cross section.

5. The knife connector as claimed in claim 4, wherein the base further has a positioning device mounted on the holding side to position a blade body in the holding cavity.

6. The knife connector as claimed in claim 5, wherein the positioning device comprises a protrusion formed on a top edge of the holding cavity.

7. The knife connector as claimed in claim 5, wherein the positioning device comprises a knob formed on a bottom of the holding cavity.

8. The knife connector as claimed in claim 1, wherein the connecting stub has a U-shaped end mounted over the connecting end of the base; and
    multiple fasteners are mounted through the U-shaped end of the connecting stub and the connecting end of the base to securely attach the connecting stub on the connecting end of the base.

9. The knife connector as claimed in claim 1, wherein the connecting stub has a hexagonal cross section.

10. The knife connector as claimed in claim 1, wherein the base further has a positioning device mounted on the holding side to position a blade body in the holding cavity.

11. The knife connector as claimed in claim 10, wherein the positioning device comprises a protrusion formed on a top edge of the holding cavity.

12. The knife connector as claimed in claim 10, wherein the positioning device comprises a knob formed on a bottom of the holding cavity.

* * * * *